United States Patent [19]
Allington

[11] 3,822,097
[45] July 2, 1974

[54] OPTICAL SYSTEM

[75] Inventor: Robert W. Allington, Lincoln, Nebr.

[73] Assignee: Instrumentation Specialties Company, Lincoln, Nebr.

[22] Filed: Jan. 10, 1973

[21] Appl. No.: 322,483

[52] U.S. Cl. ................. 356/206, 250/226, 250/484, 250/578
[51] Int. Cl. ........................................... G01n 21/22
[58] Field of Search........ 250/217 R, 205, 228, 226, 250/578, 484; 331/94.5 P; 356/201, 204, 250/205, 206

[56] References Cited

UNITED STATES PATENTS

| | | | |
|---|---|---|---|
| 3,215,843 | 11/1965 | Neil | 250/217 R |
| 3,458,261 | 7/1969 | Bentley et al. | 250/205 |
| 3,463,927 | 8/1969 | Allington | 250/228 |
| 3,633,124 | 1/1972 | Danielmeyer | 331/94.5 P |
| 3,696,309 | 10/1972 | Ward | 331/94.5 P |

*Primary Examiner*—Vincent P. McGraw
*Attorney, Agent, or Firm*—Vincent L. Carney

[57] ABSTRACT

To maintain the intensity of a beam of light applied to an absorbance cell constant in an optical system for measuring the light absorbance of a fluid within the absorbance cell, a light radiating member receives light from a primary light source and re-radiates the light with proportional intensities to one or more absorbance cells and to a photoresistive element of a light-intensity monitor, with the photoresistive element generating a signal representing changes in the intensity of light. This signal is applied through a feedback circuit to a light intensity control circuit and changes the intensity of light emitted by the primary light source in a direction that compensates for any changes in the intensity of the light emitted from the lightradiating member.

35 Claims, 4 Drawing Figures

OPTICAL SYSTEM

This invention relates to methods and apparatuses for controlling the intensity of beams of light in an optical system.

In one class of optical system, a primary light source radiates light to a light-radiating member which re-radiates the light through light absorbance cells. Variations in the intensity of light are detected by a photoresistive element which applies signals through a negative feedback circuit to change the intensity of light emitted by the primary light source in a direction that corrects for the variations.

In a prior art type of optical system of this class, a photoresistive element is positioned near the bright spot of the primary light source to directly detect variations in the intensity of the light emitted by the primary light source.

The prior art optical systems of this type have the disadvantage of not precisely maintaining the intensity of the light that is transmitted constant. The prior art optical systems lack precision for two reasons, which are: (1) the photoconductive element fails to detect changes in the instensity of the light that is transmitted because the changes occur without changes in the intensity of light emitted by the bright spot to the photoconductive element, and (2) the photoconductive element detects changes in the intensity of light emitted to it when the intensity of light being transmitted by the optical system does not change, whereupon the photoconductive element causes a false corrective change in the intensity of the light emitted by the primary light source, resulting in changes in the intensity of the light that is transmitted. No correction when one is required or a false corrective change is made, under some circumstances, because the intensity of the light emitted from one location or in one direction within the light source varies with respect to the intensity of light emitted from another location or in another direction within the primary light source, causing the light applied to the optical system for transmission to vary with respect to the light received by the photoconductive element so that the photoconductive element fails to correct changes in the intensity of the light transmitted or makes a false correction.

Accordingly, it is an object of the invention to provide a novel optical system.

It is a further object of the invention to provide a novel method and apparatus for controlling the intensity of light in one or more beams of light.

It is a still further object of the invention to provide a method and apparatus for controlling the intensity of light re-radiated from a primary light source.

It is a still further object of the invention to reradiate light to one or more light absorbance cells and to a light intensity control monitor from the same spot on a radiating member.

It is still a further object of the invention to provide a light absorbance measuring system having a very high sensitivity and very low noise level.

In accordance with the above and further objects of the invention, an optical system is provided having a primary light source, a radiating member, a light intensity monitoring system, and a system utilizing the light radiated from the radiating member to provide beams of light for use in instruments.

The radiating member receives light from the primary source of light and radiates it in a plurality of directions, with the light intensity in each direction being in a constant proportion to the light intensity in the other directions. The light monitoring system includes a photodetector that receives the light emitted from the radiating member and provides a signal through a feedback path to control the intensity of light emitted from the primary light source so that the light radiated by the light radiating member is maintained at a constant intensity.

This optical system has the advantage of providing beams of light of constant intensity even though the instensity of the light emitted from one spot within the primary light source or in one direction from the primary light source fluctuates with respect to the intensity of light emitted from another spot within the primary light source or in another direction from the primary light source.

The above and further features of the invention will be beter understood from the following detailed description when considered with reference to the accompanying drawings, in which.

Figure 1:
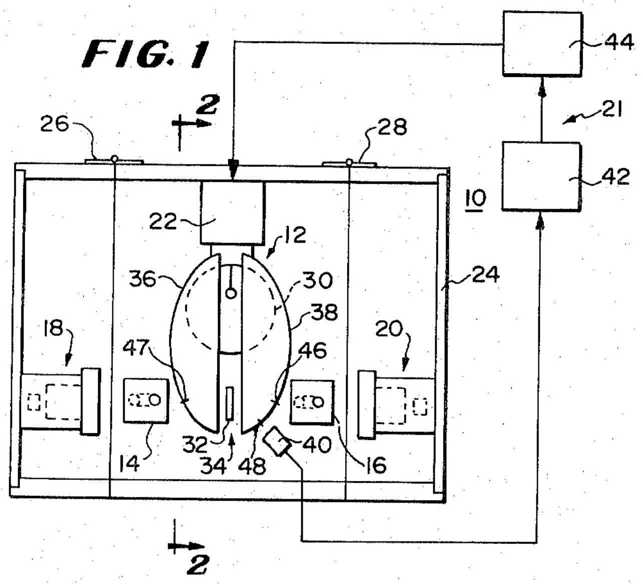
FIG. 1 is a view, partly in plan and partly schematic, of an optical system in accordance with an embodiment of the invention.

In FIG. 1, there is shown a dual-beam optical system 10 having as its principal parts a dual-beam light source 12, first and second light absorbance cells 14 and 16, first and second light measuring cells 18 and 20, and a light-intensity monitor 21, which light-intensity monitor includes a photodetector 40.

The dual-beam light source 12 is mounted by a base 22 in a central location within a parallelepiped-shaped cabinet 24 and provides two oppositely directed beams of light, with the first light absorbance cell 14 being mounted between a first side of the dual-beam light source 12 and the first light measuring cell 18 and with the second light absorbance cell 16 being mounted between the second side of the dual-beam light source 12 and the second light measuring cell 20. The first side of the dual-beam light source 12, the first light absorbance cell 14 and the first light measuring cell 18 are aligned in a first beam of light, with the first light measuring cell 18 being mounted to a first side of the cabinet 24; the second side of the dual-beam light source 12, the second light absorbance cell 16, and the second light measuring cell 20 are aligned in a second beam of light, with the second light measuring cell 20 being mounted to a second side of cabinet 24. To provide access to the interior of the cabinet 24, its sides are hinged at 26 and 28, permitting it to be easily opened for assembly, repair and the replacement of parts when needed.

The dual-beam optical system 10 is a part of photometry apparatus of the type requiring two matched beams of light. One such type of photometry apparatus, for example, locates organic solutes such as different protein and amino acids and the like as they leave a chromatographic column during fractionating of the column.

In this type of apparatus, the different organic solutes are located as they leave the column by their different light absorbances, which are determined by transmitting a first beam of light from a dual-beam source of light through the solute-containing solvent as it leaves the column and a second beam of light from the dual-beam light source through a sample of the pure solvent going into the column and comparing the intensities of the light in the two beams before and after the solvent has passed through the column. However, it is understood that there are other specific uses for the dual-beam optical system 10 known to persons skilled in the art.

Even in dual-beam optical systems it is desirable to hold the light source intensity constant in order to improve the signal to noise ratio. This is because it is often difficult to perfectly match the two channels of the dual beam system.

While a dual-beam optical system 10 is shown in FIG. 1 and described above, single beam optical systems are used for similar purposes. For example, to locate organic solutes in a chromatographic column during fractionating of the column, a single beam light source transmits its single beam of light through the effluent as it leaves the column containing the solute and the solvent. Differences in the light absorbance within this effluent stream indicate the presence of different solutes at different locations. Moreover, a dual-beam light source may be operated as two single beam light sources, utilizing either the same wave length of light in each beam or different wave lengths of light in each beam to locate organic solutes leaving two different columns. Further, light sources may be designed to provide more than two light beams using principles analogous to dual-beam optical system 10 and these systems may all be used either to compare the light absorbance of fluids from two columns or to measure effluents from individual columns without such a comparison or a combination of the two functions.

To maintain the intensity of the two beams of light constant, the photodetector 40 of the light-intensity monitor 21 is positioned to sense the light radiated by the dual beam light source 12 and connected to control the intensity of this light as will be described more completely hereinafter.

Before operating the dual-beam optical system 10, the light-intensity monitor 21 is adjusted to establish the instensity of the light to be emitted from the dual-beam light source 12.

In the operation of the dual-beam optical system 10 to compare the light absorbance of fluids in two light absorbance cells, the first beam of light from the dual-beam light source 12 impinges on the first light measuring cell 18 after passing through the first light absorbance cell 14 containing a solute to be located in a chromatographic column flow stream or to have its concentration determined and the second beam of light from the dual-beam light source 12 impinges on the second light measuring cell 20 after passing through the second light absorbance cell 16 containing only the solvent. The first and second light measuring cells generate first and second electrical signals respectively in response to the light that impinges upon them and these signals are compared to provide a comparison between the light absorbance characteristics of the substances in the first and second light absorbance cells.

When operating as a single beam optical system or as two single beam optical systems, each beam of light impinges on a different measuring cell after passing through a light absorbance cell containing a solute to be located in a chromatographic column flow stream. Each of the light measuring cells generates an electrical signal in response to the light that impinges upon it and variations in this signal indicate the location of the solute leaving the chromatographic column corresponding to the light measuring cell.

Regardless of whether the dual beam light source 12 is operating as a single beam optical system or a dual beam optical system, if the intensity of the light emitted by the dual beam light source 12 varies from the present intensity, the light-intensity monitor 21 senses the change and alters the intensity of the light in the beams of light back to the present intensity.

DETAILED STRUCTURE

The dual-beam light source 12 includes a lamp 30, a light radiating member 32, and a two-sector ellipsoidal reflector 34, with the two-sector ellipsoidal reflector 34 having a first sector 36 and a second sector 38.

To provide light from the first and second beams of light, the lamp 30 is mounted to the base 22 which serves as a socket for electrical connection and is centrally located within the dual-beam light source 12. The lamp 30 serves as a primary light source and may be any of several different types, the particular type generally being selected for its ability to provide light of the desired frequency.

In the preferred embodiment, the lamp 30 is a low pressure mercury vapor lamp that emits ultraviolet light having wavelengths which are particularly useful in some photometric apparatuses such as those that measure or compare the optical density or light absorbance of certain solutions containing organic materials such as protein, amino acid or the like. However, other types of lamps may be used as a primary light source for other purposes. This invention has particular utility in photometric apparatuses in which the light emitted from some locations in the primary light source fluctuates in intensity with respect to light emitted from other locations or in which light emitted in some directions fluctuates in intensity with respect to light emitted in other directions.

When the lamp 30 is a mercury vapor lamp as it is in the preferred embodiment, a thermal clamp is provided for the lamp. The thermal clamp may be a heat sink, which can be conveniently provided by forming the base 22 of metal.

If a thermal clamp is not provided for some types of mercury vapor lamps in the dual beam light source 12, the light intensity monitor 21 is unstable ad the current through the lamp 30 increases to a large value. The current increases because of a self-repeating chain of four events, which are: (1) current through the lamp heats the vapor in the lamp, causing the temperature and vapor pressure to increase; (2) the increase in vapor pressure causes more of the light to be absorbed by the vapor, thus decreasing the intensity of light received by the photodetector 40; (3) the reduction in light intensity sensed by the photodetector causes the light intensity monitor 21 to increase the flow of current through the lamp to bring the intensity back to the set value;

and (4) the increased flow of current further increases the temperature of the vapor within the mercury vapor lamp so as to start the chain of four events again.

Figure 2:
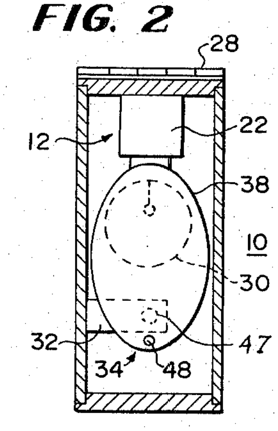
FIG. 2 is a side, sectional view of the optical system of FIG. 1, taken substantially along line 2—2 in the direction of the arrows.

To focus a large portion of the light from the lamp 30 onto the radiating member 32, the ellipsoidal reflector 34 has the general shape of a prolate spheroid, with each of the two sectors 36 and 38 being one sector of the spheroid spaced from the other sector at the center of the reflector 34 and having its concave side facing the concave side of the other. As best shown in FIG. 2, the bright spot of the lamp 30 is located in a first focus of the ellipsoidal reflector 34 to focus light on the second focus and the light radiating member 32 is located in the second focus to receive light from a large solid angle about the lamp 30.

To permit the first and second beams of light to leave the ellipsoidal reflector 34 and to permit the intensity of the light in the first and second beams of light to be monitored by the light intensity monitor 21, three light-beam holes 46, 47 and 48 are provided in the ellipsoidal reflector 34, with one of the light-beam holes 46 in one of the sectors being aligned with one of the light-beam holes 47 in the other sector and with the second focus. Because these two light-beam holes are aligned with the second focus of the ellipsoidal reflector 34 and with each other, light is not directly reflected in a straight line from one sector through the light intensity balancer 32 and the hole in the other sector into a light absorbance cell without being adequately diffused since there is no such light path, all straight paths of light from one reflector through the hole of the other reflector being at an angle with the first and second beams of light.

The third hole 48 passes through a light collimating device that transmits a third beam of light to be detected by the light-intensity monitor 21 to permit monitoring of the intensity of light radiated into the other two beams and does not transmit direct light from the lamp 30. The collimating device may be a relatively long walled aperture, a tube, a lense or other device that prevents the photodetector 40 from seeing the lamp 30.

While ellipsoidal reflectors containing holes are well suited for focusing light on the light-reflecting member 32 and permitting discrete beams of light to be transmitted from a spot on the light-reflecting member 32 to light absorbance cells and light-intensity monitors, other types of reflectors are available, which other types can be used for the same purpose when properly constructed. Moreover, some types of lens systems or combinations of lens and reflectors can be used for the same purposes as the ellipsoidal reflectors.

To cause the light beams applied to the light absorbance cells and light-intensity monitor to have intensities that are in a constant ratio to each other even when the intensity of the light emitted by lamp 30 from one location or in one direction from the lamp changes with respect to the intensity from another location or in another direction, the light radiating member 32 includes a transparent or translucent base with a flat light radiating portion mounted in one of the foci of the ellipsoidal reflector 34, the bright spot of the lamp 30 being mounted in the other of the foci. The flat light radiating portion is aligned with the light-beam holes in the sections 36 and 38 of the ellipsoidal reflector 34 in such a manner that a straight line through two of the light-beam holes 46 and 47 is perpendicular to the flat light radiating portion and a line through the third hole and intersecting the light-intensity monitor 21 is at an angle to the flat light radiating portion.

To cause the intensity of the light in the light beams to be always in the same proportion, the light radiating portion of the light radiating member 32 may include, in general, any surface or combination of surfaces that radiates light proportionately in a plurality of different directions so that beams of light having light intensities proportional to each other in such directions may be formed from the light. In the preferred embodiment of the invention, three beams of light are radiated in different directions through light-beam holes 46, 47 and 48, and in this embodiment, no lens is necessary to focus the light into beams from the light radiating member since the beams are permitted to pass through the light-beam holes in different directions, thus removing the possibility of noise in the light caused by a poorly focused lens that applies light from too large an area of the radiating member 32 into the beams.

Because light is directed in two opposite directions from the light radiating member to the light absorbance cells, the light radiating member has its smallest dimension parallel to two of the light beams and this dimension is sufficiently small to avoid any significant attenuation of the light passing through the light radiating member. Generally, it is less than one millimeter thick. Usually, the performance improves if it is translucent enough so that it radiates equally in both directions regardless of which section of the ellipsoidal reflector supplies the light that impinges upon it.

In one embodiment, the light radiating member includes, for this purpose, a translucent light diffusing surface having a passive light radiating means such as particles in a layer sufficiently thin to be translucent or having light scattering deformations in the surface. Herein, a passive light radiating means does not emit light by the changes in the state of exitation of its atoms or molecules such as happens in incandescent or fluorescent radiators but only re-radiates light.

The light diffusing surface scatters light incident upon it in a random manner, causing the light to be radiated in accordance with Lambert's cosine law, with the intensity being proportional to the cosine of the angle with respect to a normal to the light diffusing surface regardless of its location of origin in the lamp 30. Accordingly, the ratio of the intensities of the light in the beams is constant because the beams are all at a constant angle to the emitting surface. Moreover, because the light radiating member is translucent and does not absorb much light, light from each one of the sectors 36 and 38 is re-radiated from both sides of the light radiating member 32 and contributes to each of the beams of light, thereby further tending to equalize the beams of light.

In another embodiment, the light radiating member includes, for this purpose, fluorescent particles in a layer sufficiently thin to be translucent or a transparent sheet of fluorescent material mounted to the transparent or translucent base of the light radiating member 32. The fluorescent particles or sheet emit light in all directions so that each point contributes proportionately each of the beams of light. The fluorescent particles, when used, also create a diffusing surface, causing diffused light of the frequency emitted by the lamp 30 as well as light emitted by fluorescence of the particles to be directed into each of the beams of light. The light absorbed by the fluorescent particles reduces the constant-ratio effect some, but the performance is still adequate for most purposes.

The frequencies of light to be passed through the light absorbance cells 14 and 16 and applied to the photocell within the light measuring cells 18 and 20 are selected by including filters in the path of the beams of light to selectively absorb those frequencies of light that are not to be passed to the photocells. Since the filters are easily changed, the presence of two different ranges of frequencies of light, one from fluorescence of the particles and the other from diffusion of light, each of which is useful in a different application of the dual-beam optical system, enables the dual-beam optical system to be easily adapted to different applications.

In the preferred embodiment, the light absorbance cells 14 and 16 are flow cells, at least one of which is adapted to receive the solvent and solute from a chromatographic column. The flow cells include windows aligned with the two oppositely positioned light-beam holes in the ellipsoidal reflector 34, the light radiating member 32, and the light measuring cells 18 and 20 so that two oppositely-directed beams of light are radiated from the light radiating member 32 through the flow cells 14 and 16 to energize the photoconductors within the first and second light measuring cells 18 and 20. The light measuring cells 18 and 20 include appropriate filters positioned between their photocells and the light entrance aperture to pass selected frequencies of light. The dual-beam optical system 12, the light absorbance cells 14 and 16, and the light measuring cells 18 and 20 are described in greater detail in U.S. Pat. application 259,868 to Robert W. Allington filed June 5, 1972, for Dual Beam Optical System, now U.S. Pat. No. 3,783,276.

Of course, the light intensity monitor 21 may be used to control the light intensity from apparatus not described in detail in the aforementioned patent application, but it is particularly well adapted and has special advantages when used in combination with that optical system. Moreover, certain engineering changes may be necessary to adapt other types of apparatus for use in a combination including the light-intensity monitor 21. In general, the light intensity monitor 21 has particular utility when used with an optical system having a primary source of light which emits light in different directions or from different locations, with the light in one direction or from one location varying in intensity with respect to the intensity of light emitted in another direction or from another location at certain times.

The light intensity monitor 21 includes the photodetector 40, a feedback control circuit 42 and a light intensity control circuit 44. To control the light intensity control circuit 44, the feedback control circuit 42 has its input electrically connected to the photodetector 40, which is mounted in line with one of the light-beam holes 48 in the ellipsoidal reflector 34 and with the radiating member 32 and has its output electrically connected to the light intensity control 44, which is electrically connected to the lamp 30 to control the intensity thereof in response to signals from the feedback control circuit 42.

Figure 3:
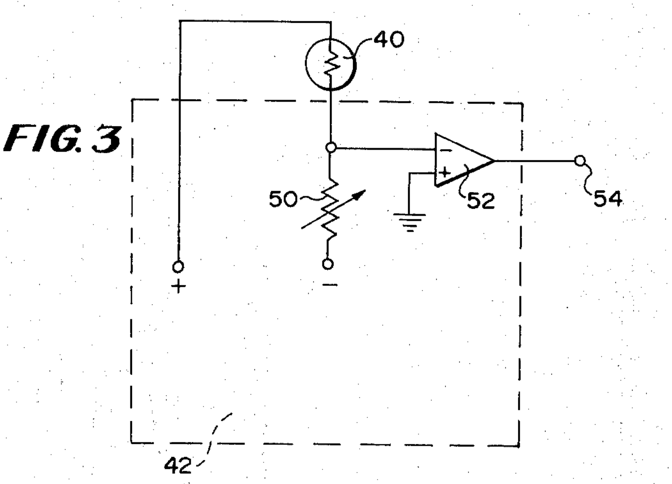
FIG. 3 is a schematic circuit diagram of the feedback circuit included in an embodiment of the invention.

In FIG. 3 there is shown a schematic circuit diagram of the photodetector 40 and the feedback circuit 42 of the light-intensity monitor 21, with the feedback circuit 42 including a potentiometer 50 and an amplifier 52.

To provide signals to the input of the amplifier 52, which signals indicate changes in the intensity of the light radiated from the light radiating member 32 (FIG. 1), the inverting input of the amplifier 52 is electrically connected to both the photodetector 40 and the potentiometer 50, with the photodetector 40, the inverting input terminal to the amplifier 52, and the potentiometer 50 being electrically connected in series in the other named between a source of positive potential and a source of negative potential.

Since the photoconductor 40 decreases its resistance as the light intensity incident upon it increases, a positive-going signal is applied to the inverting input terminal of the amplifier 52 as the intensity of light radiated from the light-radiating member 32 increases, and a negative-going potential is applied to the inverting terminal of the amplifier 52 as the intensity of light radiated from the light-radiating member 32 decreases. An output terminal 54 is electrically connected to the output of the amplifier 52 to provide a negative-going signal when the intensity of light radiated from the light radiating member 32 to the photoconductor 40 increases and to provide a positive going signal when the light intensity of the light radiated by the light-radiating member 32 to the photoconductor 40 decreases in intensity. The potentiometer 50 is adjusted to maintain signals from the photoconductor 40 within the dynamic range of the amplifier 52 and to control the sensitivity of the light-intensity monitor 21.

Figure 4:
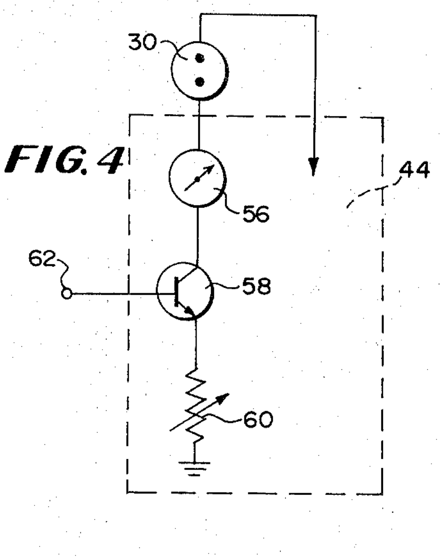
FIG. 4 is a schematic circuit diagram of a light intensity control circuit useful in an embodiment of the invention.

In FIG. 4, there is shown a schematic circuit diagram of the lamp 30 and the light intensity control circuit 44 electrically connected together, with the light-intensity control circuit 44 including a lamp current meter 56, an npn transistor 58, a potentiometer 60, and an input terminal 62. The lamp 30, the lamp-current meter 56, the npn transistor 58 and the potentiometer 60 are electrically connected in series in the order named between a source of positive potential and ground, with the base of the npn transistor being electrically connected to the input terminal 62, its collector being electrically connected to the meter 56, and its emitter being electrically connected to the potentiometer 60. To receive signals from the feedback circuit 42, the input terminal 62 of the light-intensity control circuit 44 is connected to the output terminal 54 (FIG. 3) of the feedback circuit 42.

DETAILED OPERATION

Before operation the dual-beam optical system 10, filters are inserted into the first and second light measuring cells 18 and 20 (FIG. 1), the intensity of the lamp 30 is adjusted by adjusting the potentiometers 60 and 50. The current flowing through the lamp 30 is measured by the meter 56 for convenience in making adjustments.

Generally the filters are selected in accordance with the particular use of the dual-beam optical system. For example, to detect a solute that absorbs light having a wave length of 254 nanometers, filters are inserted into the light measuring cells 18 and 20 to block light having wavelengths other than 254 nanometers, 254 nanometers being one wavelength of light emitted by low pressure mercury lamps. On the other hand, to detect a solute that absorbs light having a wavelength of between 270 and 290 nanometers, filters are inserted to block other wavelengths of light, light having a wavelength of between 270 and 290 nanometers being emitted by certain fluorescent phosphors that may be incorporated in light-radiating member 32.

In the operation of the dual-beam optical system 10 to compare a solvent containing a solute with a pure solvent, a solvent containing a solute is pumped through the first light absorbance cell 14 and pure solvent is pumped through the second light absorbance cell 16. While the solvent and solute are flowing through the absorbance cells, the first beam of light is transmitted through the first light absorbance cell to the first light measuring cell 18 and the second beam of light is transmitted through the second light absorbance cell to the second light measuring cell 20, with the first and second beams of light having proportional light intensities.

The first light measuring cell 18 and the second light measuring cell 20 derive signals representing the intensity of the light in the first and second beams of light and these signals are compared in circuitry (not shown) to obtain information about the solute flowing through the first light absorbance cell. While the first and second beams of light are being radiated through the first and second light absorbance cells, the light-intensity monitor 21 detects changes in the intensity of the light being radiated into the first and second beams of light and corrects for such changes to maintain the intensity of the light constant. Of course, in a optical unit utilizing only one beam of light or in an optical system in which the two beams of light are each used to locate solute in a different light absorbance cell, the light-intensity monitor 21 operates in the same manner.

To generate the first and second beams of light, the lamp 30 radiates light, which in the preferred embodiment is ultraviolet light having a relatively high intensity at 254 nanometers onto the light radiating member 32. Since the bright spot of the lamp 30 is in one focus and the light radiating member 32 is in the other focus of the ellipsoidal reflector 34, light from a solid angle that is a major portion of a sphere is radiated from the lamp 30 to the light radiating member 32. The light emitted in one direction or from one location within the lamp 30 may vary in intensity with respect to the light emitted in a different direction or from a different location in the lamp 30. This occurs in low pressure mercury vapor lamps because the vapor moves about in the lamp by convection, absorbing more light flowing through one path with the lamp than through another path.

To maintain the intensity of the light in the first, second and third light beams in a constant proportion to each other, the light-radiating member 32 radiates light with proportional intensities in different directions with the proportion of light radiated in each direction depending on the direction even though the light from the lamp 30 may have an intensity in one direction that varies with respect to the intensity in another direction.

In one embodiment, the light radiating member 32 is translucent diffusing surface that diffuses the light radiated to it and re-radiates it through the three light-beam holes in the ellipsoidal reflector 34. The light is radiated in accordance with Lambert's cosine law with the light impinging upon each spot, causing proportional radiation into each of the beams of light.

In another embodiment, the light radiating member 32 includes a thin translucent layer of fluorescent particles which diffuses light and fluoresces, with the diffused light making proportional contributions to each of the beams of light of a first frequency and with the fluorescent light making proportional contributions to each of the beams of light of another frequency because the intensity of the radiation of diffused light and fluroescent light is independent of the direction of the light causing the radiation.

In still another embodiment, the light radiating member is a traslucent or transparent fluorescent material which fluoresces light into each of the beams of light with proportional intensity.

After the first and second beams of light pass through the first and second light absorbance cells 14 and 16, they impinge upon the first and second light measuring cells 18 and 20, where they pass through filters that select a single spectral region to transmit to the photocells which develop signals related to the amount of light absorbed by the solute and solvent. The filters are selected in accordance with the particular application of the dual-beam optical system as explained above.

To maintain the intensity of light in the light beams constant, the photodetector 40 receives the third beam of light from the light radiating member 32 through the aperture 48, which beam of light is proportional in intensity to the first and second beams of light. The photodetector 40 generates an electrical signal in response to the third beam of light which electrical signal indicates changes in the intensity of the light radiated from the light radiating member 32 and applies this signal to the feedback control circuit 42. In response to the signal from the photodetector 40, the feedback control circuit 42 causes the light intensity control circuit 44 to correct for any changes in the intensity of the light radiated from the light radiating member 32 to maintain the light intensity in the first and second beams constant.

To receive signals indicating changes in the intensity of light from the photodetector 40 and to control the light intensity control circuit 44, changes in the resistance of the light intensity detector 40 cause changes in the input signal applied to the amplifier 52. The amplifier 52 inverts the changes and applies them to the output terminal 54 which is connected to the input terminal 62 of the light intensity control circuit 44.

When the intensity of the light on the light radiating member 32 increases, the resistence of the photodetector 40 decreases, causing the input potential to the amplifier 52 to change in a positive direction, resulting in a negative-going signal on terminal 54. When the intensity of the light from the radiating member 32 decreases, the resistence of the photodetector increases, causing the input potential to the amplifier 52 to change in a negative direction, resulting in a positive-going signal at the output terminal 54.

To control the intensity of the lamp 30 in response to changes in the light intensity emitted from the radiating member 32, a positive-going signal on the input terminal 62 of the light intensity control circuit 44 increases the conductivity of transistor 58, causing more current to flow through the lamp 30, and thereby increasing the intensity of light emitted by the lamp 30. A negative signal on input terminal 62 decreases the conductivity of the transistor 58, decreasing the current through the lamp 30 and thereby decreasing the intensity of the light emitted by the lamp 30. Accordingly, a decrease in the intensity of the light emitted by the light radiating member 32 causes an increase in the intensity of the light emitted by the lamp 30 and an increase in the intensity of the light emitted by the light radiating member 32 causes a decrease in the intensity of the light emitted by the lamp 30.

From the above description it can be understood that the dual beam optical system 10 has the advantage of providing relatively high precision in maintaining the intensity of the light in the first and second light beams constant. The control of the intensity of the beams of light is precise because the light monitoring system is controlled by light emitted from the light radiating member 32.

Although a preferred embodiment of the invention has been described with some particularity, many modifications and variations are possible in the preferred embodiment without deviating from the invention. Accordingly, it is to be understood that, within the scope of the appended claims, the invention may be practiced otherwise than specifically described.

What is claimed is:

1. A method of controlling the intensity of light applied to an object, comprising the steps of:
- radiating light from a light source to a radiating member;
- the step of radiating light from a light source to a radiating member comprising the step of focusing light from a large solid angle about a lamp which emits light in at least one direction that fluctuates in intensity with respect to light emitted in another direction onto a spot on said radiating member;
- reradiating the light from the radiating member toward said object;
- the step of reradiating the light from the radiating member toward said object including the step of passively radiating a first portion of the light from said spot on the radiating member;
- said step of passively radiating light comprising the steps of diffusing light focused on said spot from said large solid angle;
- measuring the intensity of another portion of the light emitted from said spot on said radiating member; and
- changing the intensity of light radiating from a source of light in the opposite direction from changes in the measured intensity of light emitted from said one spot on said radiating member.

2. A method according to claim 1 in which:
- said step of measuring the intensity of another portion of the light emitted from said radiating member includes the step of causing a beam of light from said one spot to impinge upon a control photodetector; and
- the step of changing the intensity of light radiated from said source of light includes the step of deriving an electrical signal from said control photodetector and controlling the current through said source of light in response to said electrical signal.

3. A method of measuring the light absorbance of a fluid comprising the steps of:
- generating at least one beam of light;
- controlling said beam of light by the method of claim 2;
- directing said beam of light through said fluid; and
- measuring at least one characteristic of light transmitted through said fluid.

4. A method according to claim 1 in which said step of re-radiating said light further includes the step of reradiating said light into a plurality of beams of light having light intensities that remain in fixed proportion to each other.

5. A method of measuring the light absorbance of the fluid comprising the steps of:
- generating at least one beam of light;
- controlling said beam of light by the method of claim 2;
- directing said beam of light through said fluid; and
- measuring at least one characteristic of the light transmitted through said fluid.

6. A method of controlling the intensity of light applied to an object, comprising the steps of:
- radiating light from a source of light to a radiating member;
- the step of radiating light from a source of light to a radiating member including a step of focusing light from a large solid angle about a lamp which emits light in at least one direction that fluctuates in intensity with respect to light emitted in another direction onto a spot on said radiating member;
- reradiating the light from the radiating member toward said object;
- the step of reradiating light from the radiating member toward said object including the step of fluorescing a portion of the light from a clear fluorescent material from said spot toward said object;
- measuring the intensity of another portion of the light emitted from said spot on said radiating member;
- changing the intensity of light radiated from the source of light in the opposite direction from the changes in the measured intensity of light emitted from said one spot on said radiating member.

7. A method according to claim 6 in which:
- the step of measuring the intensity of another portion of light emitted from said radiating member includes the step of causing a beam of light from the said one spot to impinge upon a control photodetector; and
- the step of changing the intensity of light radiated from said source of light includes the step of deriving a electrical signal from said control photodetector and controlling the current through said source of light in response to said electrical signal.

8. A method of measuring the light absorbance of a fluid comprising the steps of:
- generating at least one beam of light;
- controlling said beam of light by the method of claim 7;
- directing said beam of light through said fluid; and
- measuring at least one characteristic of the light transmitted through said fluid.

9. A method of controlling the intensity of light applied to an object comprising the steps of:
- radiating light from a source of light to a radiating member;
- the step of radiating light from a source of light to a radiating member including the steps of focusing light of at least a first frequency from a large solid angle about a lamp which emits light in at least one direction that fluctuates in intensity with respect to light emitted in another direction onto a spot on said radiating member;
- reradiating the light from the radiating member toward said object;

the step of reradiating light from the radiating member to said object including the step of fluorescing light from said spot on a particulately-surfaced fluorescent material;

measuring the intensity of another portion of said light emitted from said spot on said radiating member; and changing the intensity of light radiated from the source of light in the opposite direction from changes in the measured intensity of light emitted from said spot on said radiating member.

10. A method according to claim 9 in which the step of re-radiating light from the radiating member toward said object further includes the step of passively radiating light, said step of passively radiating light comprising the step of diffusing light focused on said spot from said large solid angle.

11. A method according to claim 9 in which:

said step of measuring intensity of another portion of said light emitted from said radiating member includes a step of causing a beam of light from said one spot to impinge upon a control photodetector; and the step of changing the intensity of light radiated from said source of light includes a step of deriving an electrical signal from said control photodetector and controlling the current through said source of light in response to said electrical signal.

12. A method of measuring the light absorbance of a fluid comprising the steps of:

generating at least one beam of light;

controlling said beam of light by the method of claim 9;

directing said beam of light through said fluid; and measuring at least one characteristic of the light transmitted through said fluid.

13. Apparatus for applying light from a light source to an object with a controlled intensity, comprising:

a light-radiating member;

said light-radiating member being positioned to receive light from said light source;

electrical power means for controlling the intensity of light emitted from said light source;

detector means for detecting the intensity of the light emitted at least in one direction from at least one spot on said light-radiating member;

feedback control means for causing said electrical power means to increase the intensity of light from said light source when said detector means detects a decrease in the intensity of said light and for causing said electrical power means to decrease the intensity of light from said light source when said detector means detects an increase in the intensity of said light;

said light source including means for emitting light in one direction that fluctuates in intensity with respect to light emitted in another direction;

focusing means for focusing light from a large solid angle about said light source onto said one spot on said light-radiating member, whereby a substantial amount of light is radiated from said one spot by said light-radiating member;

said light-radiating member being a passive light-radiating member; and said passive light-radiating member including means for substantially diffusing light.

14. Apparatus according to claim 13 in which said light radiating member includes a light-radiating means for radiating light along at least a first and a second path from said radiating member in response to said light from said source of light with a substantially constant ratio of the intensity of the light in said path to the intensity of light in said second path, which ratio is substantially independent of fluctuations in the light from said light source.

15. Apparatus according to claim 14 in which:

said focusing means includes an ellipsoidal reflector having first and second foci;

said light-radiating member being located in said first focus of said ellipsoidal reflector;

said light source including means for emitting light from said second focus of said ellipsoidal reflector;

said ellipsoidal reflector including a first section having internal walls defining a first hole;

a second section having internal walls defining a second hole;

said first hole, first path and light-radiating member being aligned; and said second hole, second path and radiating means being aligned.

16. Apparatus according to claim 13 in which:

said focusing means includes an ellipsoidal reflector having first and second foci;

said light-radiating member being located in said first focus of said ellipsoidal reflector to radiate light along at least a first and second path from said radiating member;

said light source including means for emitting light from said second focus of said ellipsoidal reflector;

said ellipsoidal reflector including a first section having internal wall defining a first hole; and a second section having internal walls defining a second hole;

said first hole, first path and light radiating member being aligned; and said second hole, second path and radiating member being aligned.

17. Apparatus according to claim 13 in which said light-radiating member is sufficiently translucent to radiate light focused upon it from any direction equally in two opposite directions.

18. Apparatus for applying light from a light source to an object with a controlled intensity, comprising:

a light-radiating member;

said light-radiating member being positioned to receive light from said light source;

electrical power means for controlling the intensity of light emitted from said light source;

detector means for detecting the intensity of the light emitted at least in one direction from at least one spot on said light-radiating member;

feedback control means for causing electrical power means to increase the intensity of light from said light source when said detector means detects a decrease in the intensity of said light and for causing said electrical power means to decrease the intensity of light from said light source when said detector means detects an increase in the intensity of said light;

said light source including means for emitting light in one direction that fluctuates in intensity with respect to light emitted in another direction;

focusing means for focusing light from a large solid angle about said light source onto said one spot of said light-radiating member, whereby a substantial amount of light is radiated from said one spot by said light-radiating member;

said light-radiating member being a clear fluorescent means for emitting light at a first frequency when impinged upon a light having a second frequency; and said light source including means for emitting light of said second frequency.

19. Apparatus according to claim 18 in which said fluorescent means comprises means for emitting light having a wave length substantially in the range of 270 to 290 nanometers and said light source is an ultraviolet lamp.

20. Apparatus according to claim 19 in which said radiating member includes a light-radiating means for radiating light along at least a first and a second path from said radiating member in response to said light from said source of light with a substantially constant ratio of the intensity of the light in said first path to the intensity of the light in said second path, which ratio is substantially independent of fluctuations in the light from said light source.

21. Apparatus according to claim 20 in which:

said focusing means includes an ellipsoidal reflector having first and second foci;

said light-radiating member being located in said first focus of said ellipsoidal reflector;

said light source including means for emitting light from said second focus of said ellipsoidal reflector;

said ellipsoidal reflector including a first section having internal walls defining a first hole; and a second section having internal walls defining a second hole;

said first hole, first path and light-radiating member being alligned; and said second hole, second path and radiating means being aligned.

22. Apparatus according to claim 18 in which said light-radiating member is sufficiently translucent to radiate light focused upon it from any direction equally in two opposite directions.

23. Apparatus for applying light from a light source to an object with a controlled intensity, comprising:

a light-radiating member;

said light-radiating member being positioned to receive light from said light source;

electrical power means for controlling the intensity of light emitted from said light source;

detector means for detecting the intensity of the light emitted at least in one direction from at least one spot on said light-radiating member;

feedback control means for causing said electrical power means to increase the intensity of light from said light source when said detector means detects a decrease in the intensity of said light and for causing said electrical power means to decrease the intensity of light from said light source when said detector means detects an increase in the intensity of said light focusing means for focusing light from said light source onto a spot on said light-radiating member, whereby a substantial amount of light is radiated by said light-radiating member.

said light-radiating member including means for substantially reradiating light in directions spatially independent from the directions of the light impinging upon it.

24. Apparatus according to claim 23 in which said means for re-radiating light comprises a plurality of particles.

25. Apparatus according to claim 24 in which:

said plurality of particles comprise fluorescent means for emitting light at a first frequency when impinged upon by light having a second frequency; and said light source includes means for emitting light of said second frequency, whereby fluorescent light of said first frequency are directed toward said object.

26. Apparatus according to claim 24 in which said plurality of particles comprise means for passively reradiating diffused light and for radiating fluorescent light toward said object.

27. Apparatus according to claim 26 in which said light-radiating member includes a light-radiating means for radiating light along at least a first and a second path from said source of light with a substantially constant ratio of the intensity of the light in said first path to the intensity of the light in said second path, which ratio is substantially independent of fluctuations in the light from said light source.

28. Apparatus according to claim 27 in which:

said focusing means includes an ellipsoidal reflector having first and second foci;

said light-radiating member being located in said first focus of said ellipsoidal reflector;

said light source including means for emitting light from said second focus of said ellipsoidal reflector;

said ellipsoidal reflector including a first section having internal walls defining a first hole and a second section having internal walls defining a second hole;

said first hole, first path and light-radiating member being aligned; and said second hole, said second path and radiating member being aligned.

29. Apparatus according to claim 28 in which said particles comprise means for radiating light having a wave length substantially in the range of 270 to 290 nanometers, and said light source is an ultraviolet lamp.

30. Apparatus according to claim 25 further including light-collimating means for passing collimated light from said one spot to said detector means.

31. Apparatus according to claim 23 in which said light-radiating member is sufficiently translucent to radiate light focused upon it from any direction equally in two opposite directions.

32. Apparatus for applying light from a light source to an object with a controlled intensity, comprising:

a light-radiating member;

said light-radiating member being positioned to receive light from said light source;

electrical power means for controlling the intensity of light emitted from said light source;

detector means for detecting the intensity of light emitted at least in one direction from at least one spot on said light-radiating member;

feedback control means for causing said electrical power means to increase the intensity of light from said light source when said detector means detects a decrease in the intensity of said light and for causing said electrical power means to decrease the intensity of light from said light source when said detector means detects an increase in the intensity of said light;

said light source being a mercury vapor lamp;

said apparatus including temperature control means for maintaining the temperature of said mercury vapor lamp within a predetermined range.

33. Apparatus according to claim 32 in which said temperature control means is a heat sink positioned adjacent to said mercury vapor lamp.

34. Apparatus for applying light from a light source to an object with a controlled intensity, comprising:

a light-radiating member;

said light-radiating member being positioned to receive light from said light source;

electrical power means for controlling the intensity of light emitted from said light source;

detector means for detecting the intensity of the light emitted at least in one direction from at least one spot on said light-radiating member; and feedback control means for causing said electrical power means to increase the intensity of light from said light source when said detector means detects a decrease in the intensity of the said light and for causing said electrical power means to decrease the intensity of light from said light source when said detector means detects an increase in the intensity of said light;

light-blocking means for transmitting light in said one direction from said one spot and for blocking light in all directions forming a straight line between said light source and said detector means.

35. Apparatus according to claim 34 in which said light-blocking means includes light-collimating means for passing collimated light from said one spot to said detector means.

* * * * *